United States Patent [19]

Sassmann

[11] 4,292,927
[45] Oct. 6, 1981

[54] SWINE SHELTER VENTILATING SYSTEM

[75] Inventor: Stanley W. Sassmann, Denver, Iowa

[73] Assignee: Farmstead Industries, Div. of Farmhand, Inc., Waterloo, Iowa

[21] Appl. No.: 44,378

[22] Filed: Jun. 1, 1979

[51] Int. Cl.³ .............................. A01K 1/00; F24F 7/06
[52] U.S. Cl. ........................................ 119/16; 119/28; 98/33 R
[58] Field of Search ................... 119/16, 21, 28, 27; 98/32, 119, 33 R

[56] References Cited

U.S. PATENT DOCUMENTS

| | | | |
|---|---|---|---|
| 1,615,964 | 2/1927 | Straight | 98/32 |
| 1,903,510 | 4/1933 | Laboon et al. | 98/32 |
| 1,981,166 | 11/1934 | Duttweiler | 119/16 |
| 2,354,292 | 7/1944 | Waterman | 98/33 |
| 2,708,868 | 5/1955 | Loomis | 98/32 |
| 3,225,739 | 12/1965 | Brodrick | 119/16 X |
| 3,601,096 | 8/1971 | Rutherford | 119/15 |
| 3,677,229 | 7/1972 | Blough et al. | 119/16 |
| 3,951,336 | 4/1976 | Miller et al. | 119/16 X |

Primary Examiner—Hugh R. Chamblee
Attorney, Agent, or Firm—Henderson & Sturm

[57] ABSTRACT

A ventilating system for a swine shelter including an air inlet device located on the prevailing wind sidewall of such shelter and an air exhaust device on the other side of such shelter. The air inlet and exhaust devices include fans controlled by timers and thermostats so as to maintain a closed-shelter, controlled-environment type of confinement system. The air inlet is located within the eave of the shelter but the air exhaust is located so as to accept air from the manure pit only. A second air inlet and air exhaust are provided for use in the non-winter months.

6 Claims, 8 Drawing Figures

SWINE SHELTER VENTILATING SYSTEM

BACKGROUND OF THE INVENTION

The invention relates to ventilation systems for buildings and, more particularly, to ventilation systems that are used in swine finishing shelters.

The swine industry is rapidly adopting the total confinement approach to managing and raising hogs. The approach consists of keeping swine continuously confined within a building from the time of birth to the time they are delivered to market. It has been found that total confinement can result in increased hog production as well as much improved working conditions for the farmer. On the other hand, confinement can also produce undesirable conditions for the animals which heretofore have not existed. These conditions vary considerably depending on the season of the year. In particular, care must be taken in the winter to preserve heat within the building, while in the summer heat and moisture are undesirable conditions. Additionally, toxic fecal gases are always a problem. To alleviate undesirable, confinement conditions, a properly designed ventilation system is a necessity.

Pig raisers basically use two types of swine shelters. During the milder times of the year—late spring, summer, and early autumn—an open shelter which has a roof and less than four sidewalls may be used. During harsher periods such as late fall, winter, and early spring hogs may be confined within a totally closed shelter. Or, as indicated previously, the closed shelter concept may be utilized year-around.

In an open shelter, the swine are allowed to range outside or to enter the building to gain protection from the sun or inclement weather. A special ventilation system is unnecessary since air is readily and continuously exchanged through the one or more open sides of the building. The open shelter concept is economical and works under proper climatic conditions.

In a closed shelter, a ventilation system is a necessity, and the prior art shows a variety of systems. One such system appears in U.S. Pat. No. 3,951,336. It uses pressure and temperature sensors to operate a series of baffles and fans. Somewhat less complex is the system shown in U.S. Pat. No. 3,601,096. It uses air inlets formed at the juncture of the sidewalls and the roof and a plurality of air outlets located in the center of the roof with thermostatically-controlled fans therein. Other prior art systems use various types of eave or sidewall inlet openings in conjunction with various exhaust-duct arrangements. See, for example, U.S. Pat. Nos. 2,708,868 and 1,615,964. In summary, the prior art shows an expensive, completely-automated, environmental control system which conceivably could be used year-around, and it shows less-expensive ventilation systems which would be adequate on a seasonal basis, but not year-around.

SUMMARY OF THE INVENTION

In accordance with the present invention, an inexpensive, year-around ventilation system is integrated into a swine finishing shed. The invention includes an adjustable ventilation system which may be operated at a minimal, life-sustaining, air exchange rate in the winter and which in the summer may be operated at a maximal air exchange rate much like, although more efficient than, an open shelter. Additionally, the various adjustment means allow for appropriate ventilation during transitional weather periods. Thus, a unique characteristic of the invention is that the advantages of two types of swine shelters are retained within a single shelter. In particular, an inexpensive and minimal, yet regulatable and sufficient ventilation means is provided for closed shelter winter use, while the open shelter advantages of continuous air exchange and cooling are realized in the summer.

In the winter particularly, but also year-around, two or more exhaust ducts with enclosed, time and temperature regulated fans are provided to evacuate toxic fecal gases from the manure pit. Air replenishment is provided by means of pre-set air inlet ducts located in the eave of the prevailing wind side of the shelter.

In addition to the above-mentioned ducts, the invention provides large doors on both the prevailing wind and leeward sides of the building. The prime advantage of these doors is that they may be opened in the summer to provide inexpensive open-shelter-like ventilation. Of further advantage, however, is that the doors are adjustable and may be adjusted from outside the shelter so that the caretaker never needs to enter the animal pens to regulate the ventilation system.

Another advantage of the invention is that all inlet and exhaust vents are covered with a wire screen to prevent disease-carrying birds and other carriers from entering the building.

Other objects, advantages, and novel features of the present invention will become apparent from the following detailed description of the invention when considered in conjunction with the accompanying drawings.

DESCRIPTION OF THE PREFERRED EMBODIMENT

Figure 1:
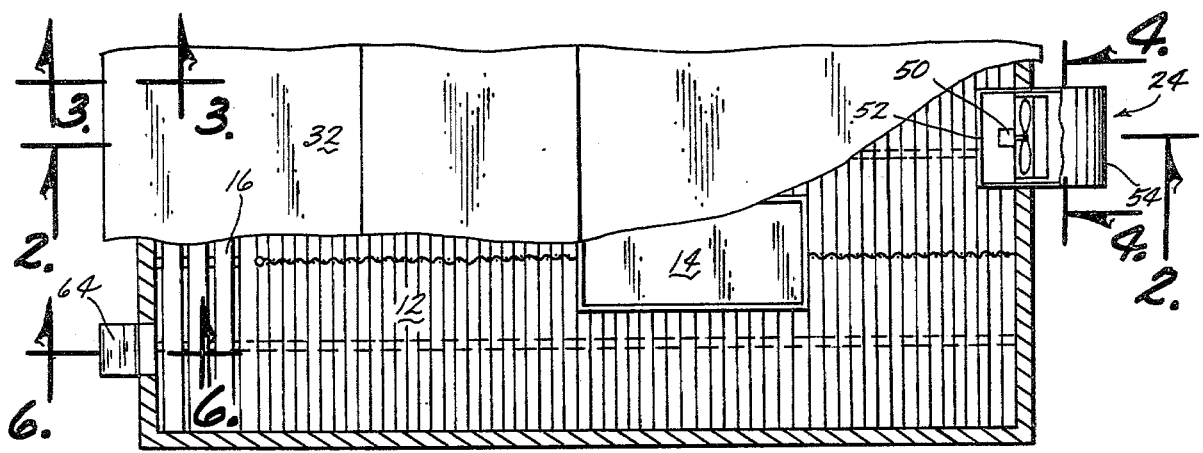
FIG. 1 is a top, plan view of the swine shelter house of this invention.
Figure 2:
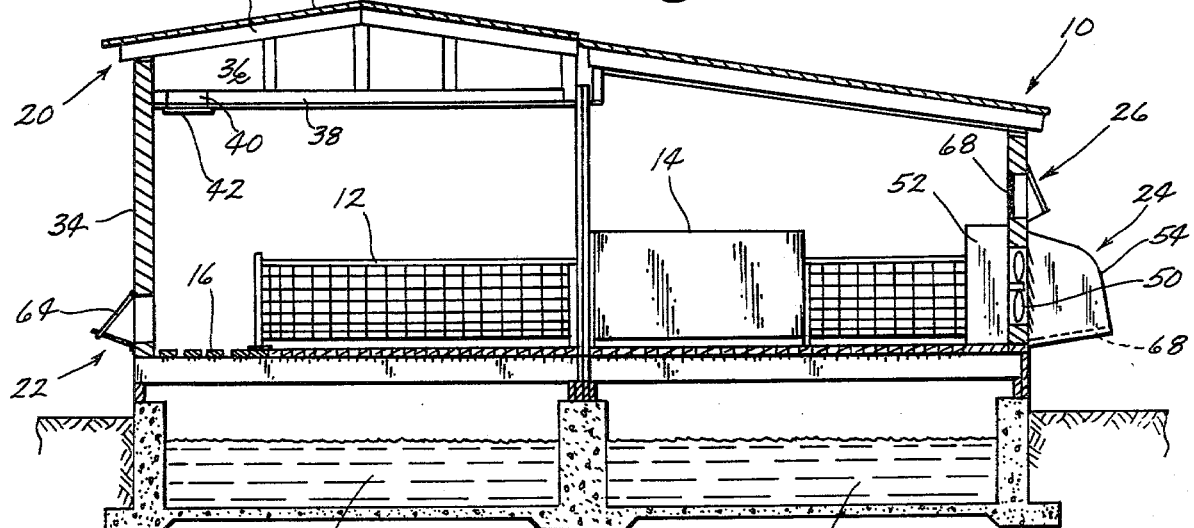
FIG. 2 is a side, cross-sectional view of the shelter taken along line 2—2 of FIG. 1.

Referring now to the drawings wherein like reference numerals designate identical or corresponding parts throughout the several views, FIG. 1 shows a top, plan view of a swine shelter house 10. The cross-sectional view of the shelter 10 in FIG. 2 shows an animal pen 12, feeder 14, floor 16, and total area manure pit 18. Of more pertinence, however, is a first air inlet device 20, a second air inlet device 22, a first exhaust device 24, and a second exhaust device 26.

Figure 3:
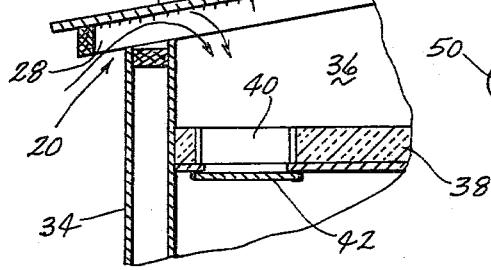
FIG. 3 is an enlarged, cross-sectional view of the eave air inlet means taken along line 3—3 of FIG. 2.

The preferred embodiment of the first air inlet device 20 is best shown in FIG. 3. A plurality of openings 28 exist between the rafters 30 of the shelter roof 32 above the sidewall 34. Fresh air can pass through the openings 28 into a void area 36 defined by the shelter roof 32, the sidewall 34 and an insulated false ceiling 38.

A plurality of second openings 40 are located near the sidewall 34 in the false ceiling 38. Pre-set openings 42 provide entry for an appropriate quantity of air.

Figure 4:
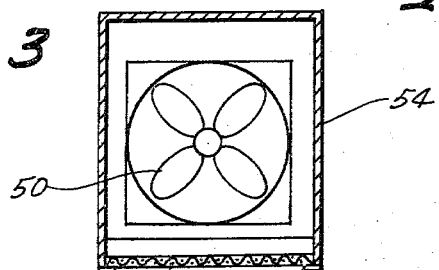
FIG. 4 is view of the fan enclosed within the hood of the year-around air exhaust taken along line 4—4 of FIG. 1.

The first air exhaust device 24 is used to exhaust toxic gases from the manure pit 18. Referring to FIG. 2, air is drawn by means of an exhaust fan 50 through a vent chamber 52 for expelling manure pit gases into a protective hood 54 which is open at a bottom portion thereof to the outdoors. Manually adjustable metering doors are provided within the hood as indicated for adjusting the discharge of the toxic gases. FIG. 4 shows a front view of the fan 50 with the hood 54 in cross-section.

Figure 5:
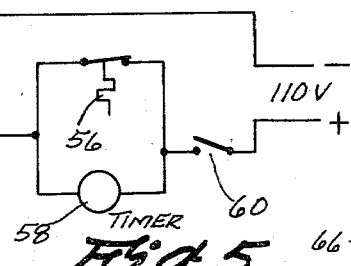
FIG. 5 is a schematic diagram of the wiring for the fan and control devices.

An electrical schematic for the fan 50 is given in FIG. 5. As shown, the fan 50 is controlled by either or both a thermostat 56 and a timer 58. Either the thermostat 56 or the timer 58 may be disabled as a fan 50 regulator by opening the appropriate switch 60.

Figure 6:
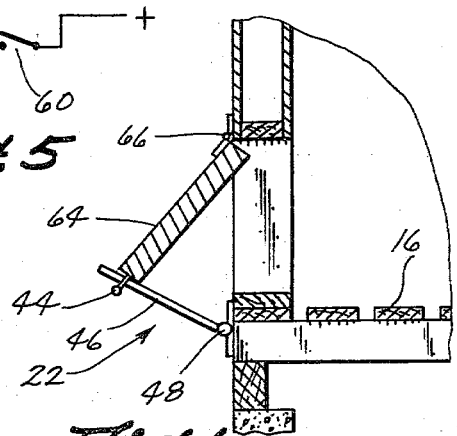
FIG. 6 is an enlarged, cross-sectional view of an air inlet vent door taken along line 6—6 of FIG. 2.

The second air inlet device 22 and the second air exhaust device 26 are constructed exactly the same. FIG. 6 shows the second air inlet means 22 in detail. Door 64 is attached by a hinge 66 to sidewall 34. In the open position, the door 64 is adjustable by moving a hair-pin cotter key 44 to the appropriate position on holding rod 46 which, in turn, is attached to sidewall 34 with hinge 48.

As shown in FIGS. 2, 3, 4, and 6, within all vent passageways there is fastened a wire screen 68 to prevent disease carrying birds and other carriers from entering the shelter.

Figure 7:
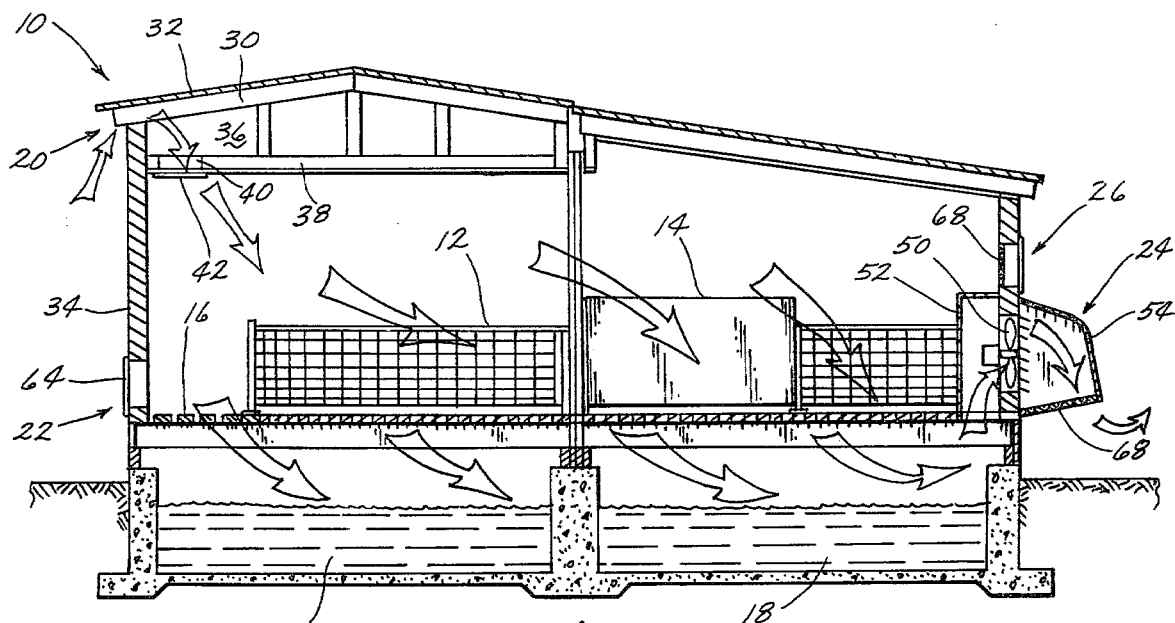
FIG. 7 is a cross-sectional view of the shelter depicting air movement through the shelter during the winter.
Figure 8:
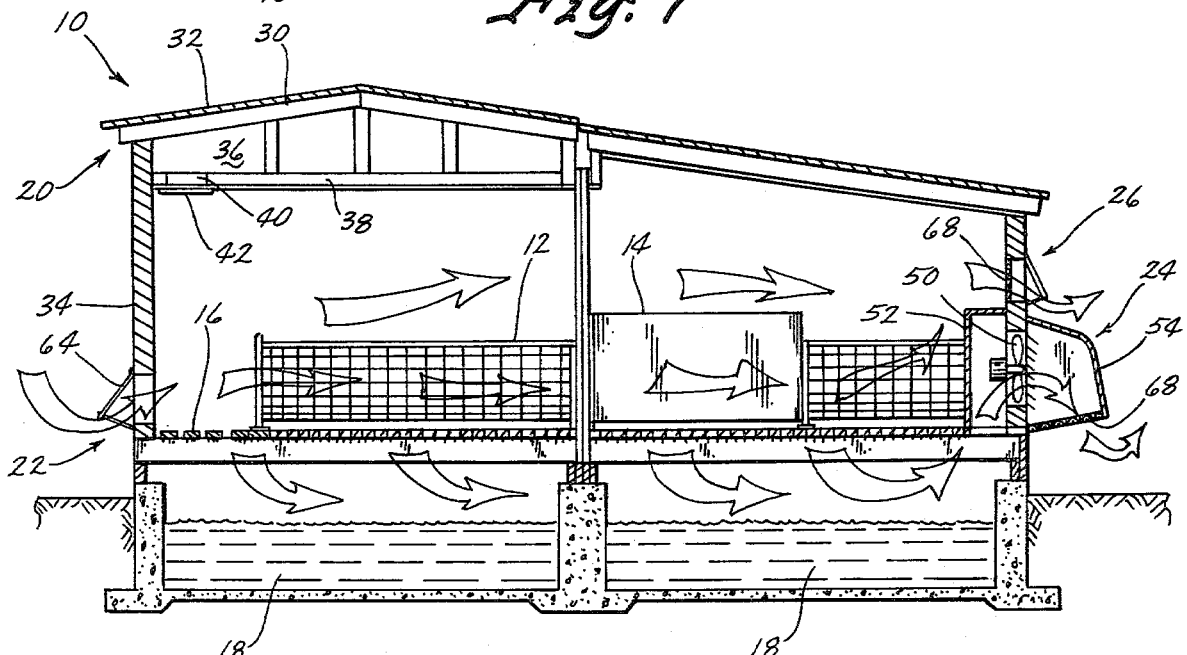
FIG. 8 is a cross-sectional view of the shelter depicting air movement through the shelter during the summer.

The invention has two basic modes of operation. A winter mode provides environmental control by balancing the need to exhaust stale air and toxic gases from the shelter against the need to reduce drafts and maintain a comfortable temperature within the building. The winter mode, with a circulation pattern as shown in FIG. 7, utilizes the first air inlet device 20 and the first air exhaust device 24. Best results occur when there are at least two fans 50. One fan 50 is set to operate 2 to 3 minutes out of every 10 minutes with a thermostatic shutoff when the building temperature becomes too cool. The second fan is controlled only by thermostat and turns on only when the temperature rises above a specific level.

In the spring and fall, one fan 50 is set to operate at all times while the other fan 50 is controlled, as before, by a thermostat. The vent doors 64 are opened manually and adjusted as weather conditions require.

In the summer when the vent doors 64 are wide open, both fans 50 are thermostatically controlled. One fan is set to run when the shelter air is above 70 degrees fahrenheit; the other fan is set to run at temperatures greater than 80 degrees. For best results in the summer, open-shelter mode, the shelter should be placed when first built so that the air inlet devices are facing the locally prevailing wind.

Obviously many modifications and variations of the present invention are possible in light of the above teachings. It is, therefore, to be understood that, within the scope of the appended claims, the invention may be practiced otherwise than as specifically described.

I claim:

1. A ventilation system for a swine shelter house having an interior spaced defined by a roof, first, second, third, and fourth sidewalls, the first and third sidewalls being disposed opposite to each other, and a manure pit; a slotted floor being disposed above the manure pit, said ventilation system comprising:
   a first air inlet means disposed approximately at the juncture of the first sidewall and the roof, for permitting air flow from the outside atmosphere into the interior space;
   a second air inlet means disposed in a lower portion of the first sidewall, for permitting flow of outside atmospheric air into the interior space;
   a first air exhaust means formed in the third sidewall above the level of the slotted floor, for permitting air flow into the outside atmosphere from only the interior air space within the manure pit below the floor;
   a second air exhaust means, formed in the upper portion of the third sidewall, for permitting air flow from the interior space into the outside atmosphere; said system being operable in a winter mode and a summer mode; said winter mode comprising a winter ventilation system wherein said first air inlet means is open and said second air inlet means is closed, and said first air exhaust means is open and said second air exhaust means is closed; said summer mode comprising a summer ventilation system wherein said first air inlet means is closed and said second air inlet means is open, and said first air exhaust means and said second air exhaust means are open; and only said first air exhaust means employs powered ventilation in the form of an exhaust fan disposed in said third sidewall to draw outside air through said first sidewall across said house into said manure pit and thru said third sidewall via a vent chamber which extends from said slotted floor and surrounds said exhaust fan.

2. A ventilation system as defined in claim 1 wherein the first air inlet means includes a door and means for adjusting the position of the door from inside the shelter.

3. A ventilation system as defined in claim 1 wherein the first air exhaust means includes a fan and a hood attached to the exterior of the shelter, and thermostat and timer means for controlling the operation of the fan.

4. A ventilation system as defined in claim 1 wherein the second air inlet means includes a door and means for adjusting the position of the door from outside the shelter.

5. A ventilation system as defined in claim 1 wherein the second air exhaust means includes a door and means for adjusting the position of the door from outside the shelter.

6. A ventilation system as defined in claim 1 wherein the first and second air inlet means and the first and second air exhaust means include a wire mesh for preventing birds from passing therethrough.

* * * * *